(12) United States Patent
Li et al.

(10) Patent No.: US 9,971,938 B2
(45) Date of Patent: May 15, 2018

(54) CAMERA MODULE

(71) Applicants: HONG FU JIN PRECISION INDUSTRY (Shenzhen) CO., LTD., Shenzhen (CN); HON HAI PRECISION INDUSTRY CO., LTD., New Taipei (TW)

(72) Inventors: Yong Li, Shenzhen (CN); Jun-Hui Yu, Shenzhen (CN); Shu-Sheng Peng, Shenzhen (CN); Dai-Peng Zhu, Shenzhen (CN); Chien-Liang Chou, New Taipei (TW); Shin-Wen Chen, New Taipei (TW)

(73) Assignees: HONG FU JIN PRECISION INDUSTRY (SHENZHEN) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 269 days.

(21) Appl. No.: 14/733,190

(22) Filed: Jun. 8, 2015

(65) Prior Publication Data
US 2016/0127658 A1 May 5, 2016

(30) Foreign Application Priority Data
Oct. 29, 2014 (CN) .......................... 2014 1 0588353

(51) Int. Cl.
*H04N 5/33* (2006.01)
*G06K 9/00* (2006.01)
*H04N 5/225* (2006.01)

(52) U.S. Cl.
CPC ....... *G06K 9/00604* (2013.01); *H04N 5/2252* (2013.01); *H04N 5/2254* (2013.01); *H04N 5/2257* (2013.01); *H04N 5/33* (2013.01); *H04N 5/332* (2013.01)

(58) Field of Classification Search
CPC ...... H04N 5/33; H04N 5/2252; H04N 5/2254; G06K 9/00604
See application file for complete search history.

(56) References Cited

U.S. PATENT DOCUMENTS

| 2007/0057764 A1* | 3/2007 | Sato | G06K 9/00006 340/5.52 |
| 2008/0143868 A1* | 6/2008 | Tsuchiya | G03B 7/00 348/360 |

FOREIGN PATENT DOCUMENTS

| CN | 101930154 A | 12/2010 |
| CN | 202794804 U | 3/2013 |

* cited by examiner

*Primary Examiner* — Shawn An
(74) *Attorney, Agent, or Firm* — ScienBiziP, P.C.

(57) ABSTRACT

Camera module with switchable light filters includes a lens, a body, a movable tray, a first filter, a second filter, a gear and a protective cover. The lens is disposed in the body. The body defines a first through hole corresponding to the lens and includes a first surface. The movable tray is positioned on the first surface and is used for receiving the first filter and the second filter. The gear is arranged on the first surface by a rotating shaft, the gear is configured to engage with the movable tray to switch the first filter and the second filter. The protective cover is disposed on the body and partially covers the gear.

10 Claims, 5 Drawing Sheets

CAMERA MODULE

FIELD

The subject matter herein generally relates to an image-capturing device.

BACKGROUND

In the field of photography, the camera module mainly acquires visible light to capture the images. A camera module may have filters against ultraviolet and infrared light to avoid the ultraviolet and infrared light affecting the image quality. However, a mobile device may have iris recognition embedded in the camera module and captures infrared light of 800-850 nm wavelengths which is necessary for the iris recognition feature to function.

BRIEF DESCRIPTION OF THE DRAWINGS

Implementations of the present technology will now be described, by way of example only, with reference to the attached figures.

DETAILED DESCRIPTION

Figure 1:
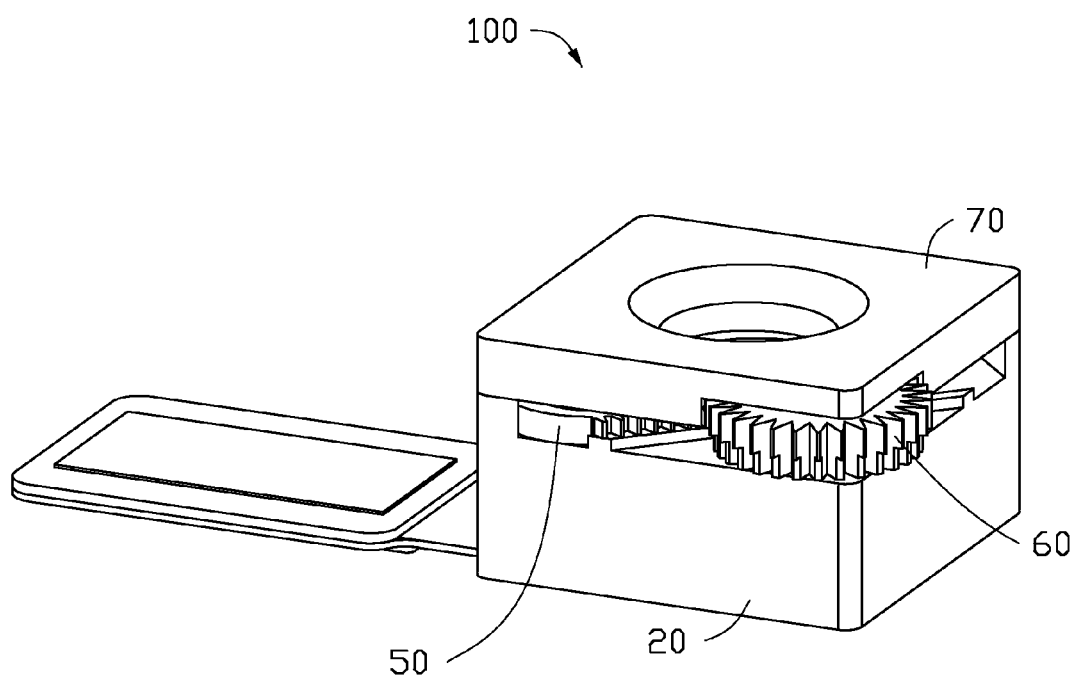
FIG. 1 is an isometric view of a camera module according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
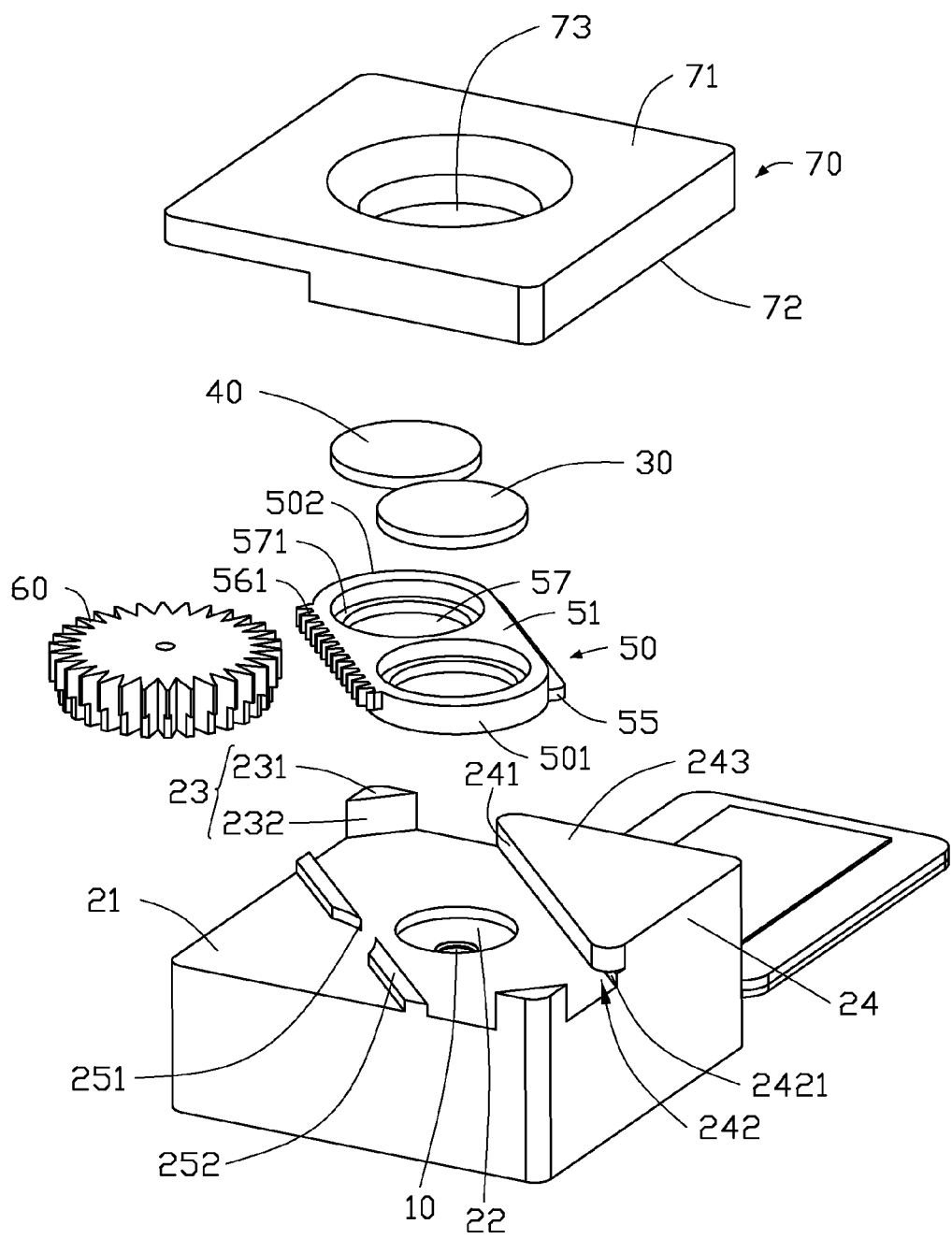
FIG. 2 is an isometric, exploded view of the camera module in FIG. 1 according to the present disclosure.
Figure 3:
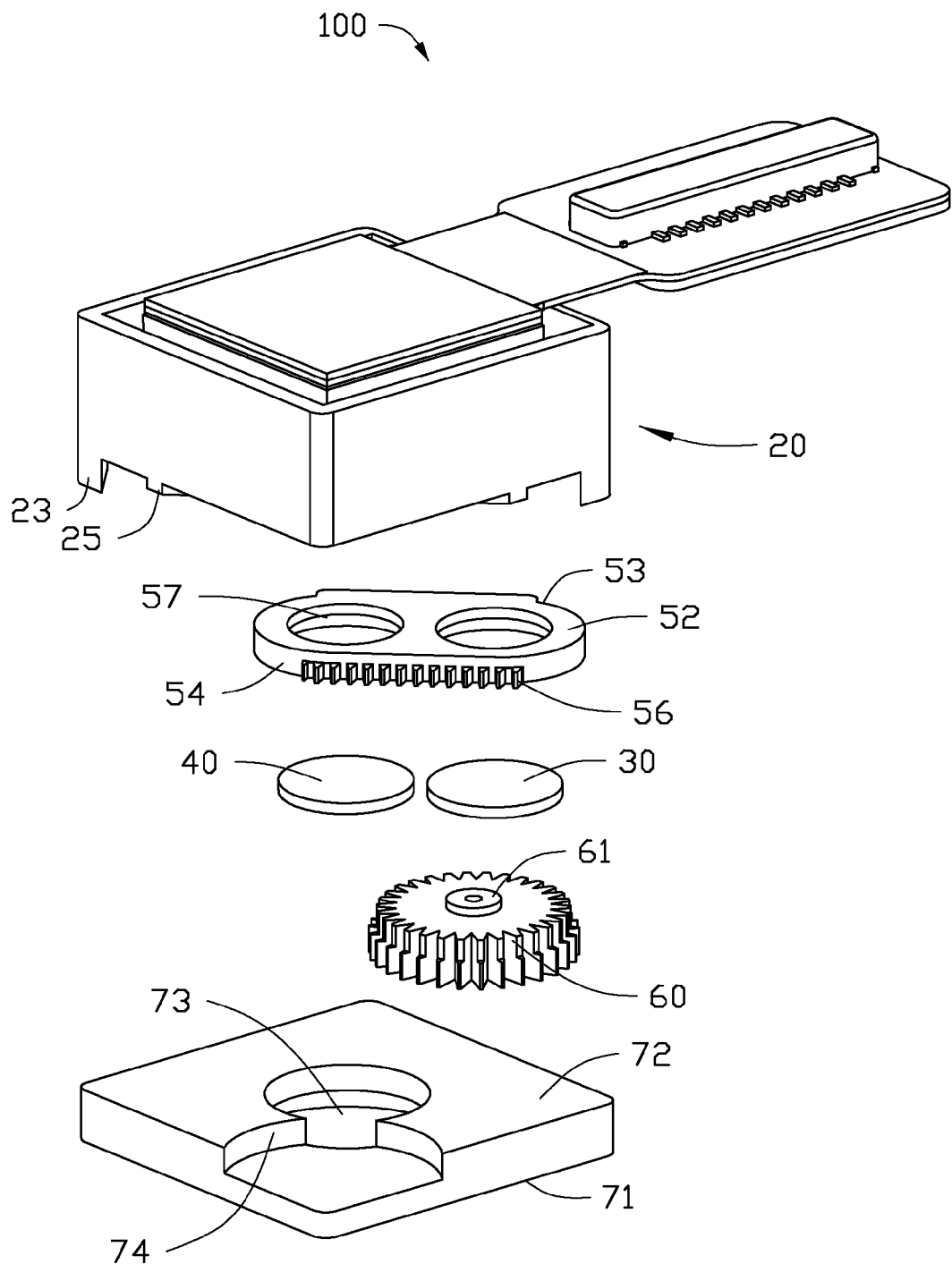
FIG. 3 is an isometric, exploded view of the camera module in FIG. 1 viewing from a different angle according to the present disclosure.

FIG. 1 is a schematic structure of a camera module 100, and FIG. 2 and FIG. 3 are the top view and bottom view of the exploded structures of the camera module 100. FIG. 1 to FIG. 3 illustrate the camera module 100 which includes a lens 10, a body 20, a first filter 30, a second filter 40, a movable tray 50, a gear 60 and a protective cover 70.

The body 20 is substantially a rectangular shape and includes a first surface 21 with a first through hole 22 opened on the first surface 21. The first through hole 22 is located in the geometric center of the first surface 21. The first surface 21 extends two first projections 23 which are positioned symmetrically to the central axis of the first through hole 22, each of the two first projections 23 includes a first end surface 231 which is parallel to the first surface 21 and a first side surface 232 which is perpendicular to intersect with the first end surface 231 and the first surface 21. The central axis of the first through hole 22 and each of geometric centers of the two first projections 23 are located in the same plane A (not shown). A carrier member 24 extends from the first surface 21 at one side of the plane A, the carrier member 24 includes a second surface 241 parallel to the plane A and perpendicular to the first surface 21, the second surface 241 opens a first receiving groove 242 along the parallel direction of the first surface 21, the first receiving groove 242 includes a bottom surface 2421 perpendicularly intersecting with the first surface 21. The carrier member 24 further includes a second end surface 243 parallel to the first surface 21 and perpendicular to the second surface 241. Two vertical guide strips 25 extend from the first surface 21, located at the other side of the plane A, the two guide strips 25 are spaced and arranged along a direction parallel to the plane A. Each of the two guide strips 25 includes a first contact surface 251 which is parallel to the second surface 241 and opposed to the second surface 241, and a third end face 252 which is parallel to the first surface 21 and intersects with the first contact surface 251. The first contact surface 251 is face to face with the bottom surface 2421.

A visible light first filter 30 is used for filtering out a non-visible light, preferably light with a wavelength of about 400 nm or less and a wavelength of about 700 nm or more.

An infrared second filter 40 is used for filtering out a light with a wavelength outside of the infra-red range, and preferably about 800 nm-850 nm.

The movable tray 50 includes a fourth end face 51, a fifth end face 52 which is parallel to the fourth end face 51, a second side surface 53 which is perpendicular to intersect with the fourth end surface 51 and the fifth end surface 52, a second contact surface 54 which is parallel to the second side surface, a first curved surface 501 which intersects with the second side surface 53 and the second contact surface 54, and a second curved surface 502 which is opposite to the first curved surface 501 and intersects with the second side surface 53 and the second contact 54. In this embodiment, the radius of curvature, $R_a$, of the first curved surface 501 and the radius of curvature, $R_b$, of the second curved surface 502 are equal. In another embodiment, the radius of curvature, $R_a$, of the first surface 501 and the radius of curvature, $R_b$, of the second curved surface 502 are different. The first curved surface 501 and the second curved surface 502 can be separately replaced by planes.

A strip block 55 extends perpendicularly from the second side surface 53. The second contact surface 54 is fixed with a toothed bar 56. The fourth end surface 51 opens two stepped holes 57 with the central axes located at the same plane, the central axis of the first curved surface 501 and the central axis of the second curved surface 502 coincide with the corresponding central axis of the two stepped holes 57, respectively. Each of the two stepped holes 57 has a diameter corresponding to the diameter of the first through hole 22, and has a stepped-hole diameter corresponding to the diameter of the first filter 30 and the second filter 40. Each of the two stepped holes 57 includes a stepped surface 571 parallel to the fourth end surface 51. The distance between the central axis of the first through hole 22 and the first side surface 232 is equal to the sum of the distance between the central axes of the two stepped holes 57 and the radius of curvature, $R_a$, of the first curved surface 501. That is, the distance between the central axis of the first through hole 22 and the first projection 23 is equal to a distance between the center axis of one of stepped holes 57 and the end of the moveable tray 50 away from the one of stepped holes 57. The toothed bar 56 includes a plurality of teeth 561, the plurality of teeth 561 are arranged in a direction substantially parallel to the arrangement direction of two stepped holes 57.

The camera module 100 further comprises a rotating shaft 61, one end of the rotating shaft 61 and the gear 60 are connected to rotate together, and another end of the rotating shaft is fixed to the first surface 21.

The protective cover 70 includes a third surface 71 and a fourth surface 72 which is parallel to the third surface 71, the third surface 71 opens a light through hole 73 which has a diameter corresponding to the diameter of the first through hole 22. The light through hole 73 penetrates through the third surface 71 and the fourth surface 72. The fourth surface 72 opens a second receiving groove 74 communicating with the light through hole 73.

When assembling the camera module 100, the lens 10 is provided in the body 20 and corresponds to the first through holes 22. A portion of the lens 10 penetrates into the first through hole 22. The movable tray 50 is disposed on the first surface 21, the strip block 55 of the movable tray 50 is accommodated in the first receiving groove 242 and contacts with the bottom surface 2421, the second contact surface 54 of the movable tray 50 contacts with the two first contact surfaces 251, the toothed bar 56 is located on the third end surface 252. The first filter 30 is provided at one of the two stepped surfaces 571; the second filter 40 is disposed on another one of the two stepped surfaces 571. The end of the rotating shaft 61 is vertically fixed to the first surface 21 and disposed opposite to the two guide strips 25. The gear 60 is meshed with the toothed bar 56. The protective cover 70 is fixed on the second end surface 243 and two first end surfaces 231, the second receiving groove 74 is used for receiving the gear 60, the projection of the gear 60 along the central axis of the first through hole 22 partially falls on the first surface 21.

Figure 4:
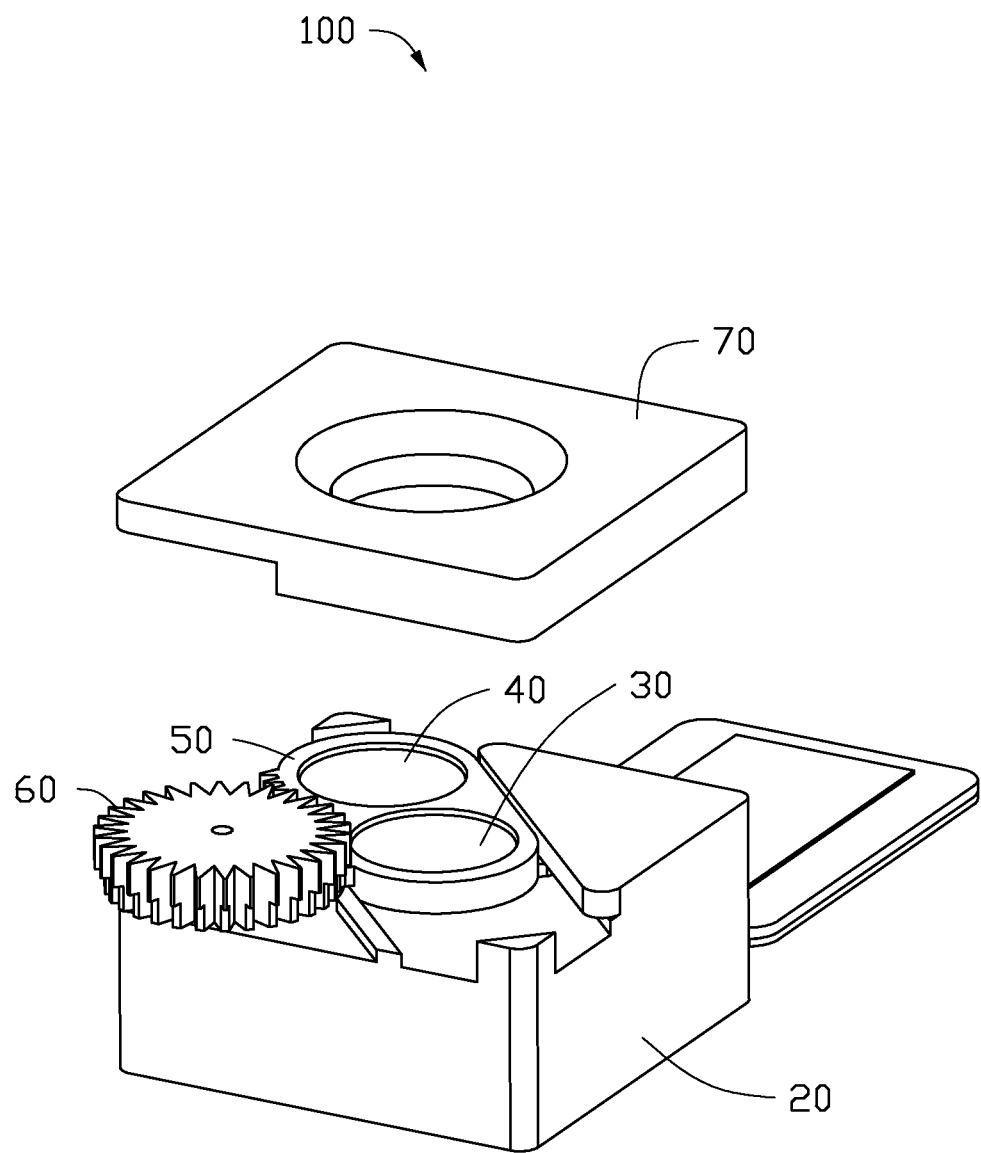
FIG. 4 is an isometric view of a camera module in FIG. 1 rotating to a first filter according to the present disclosure.
Figure 5:
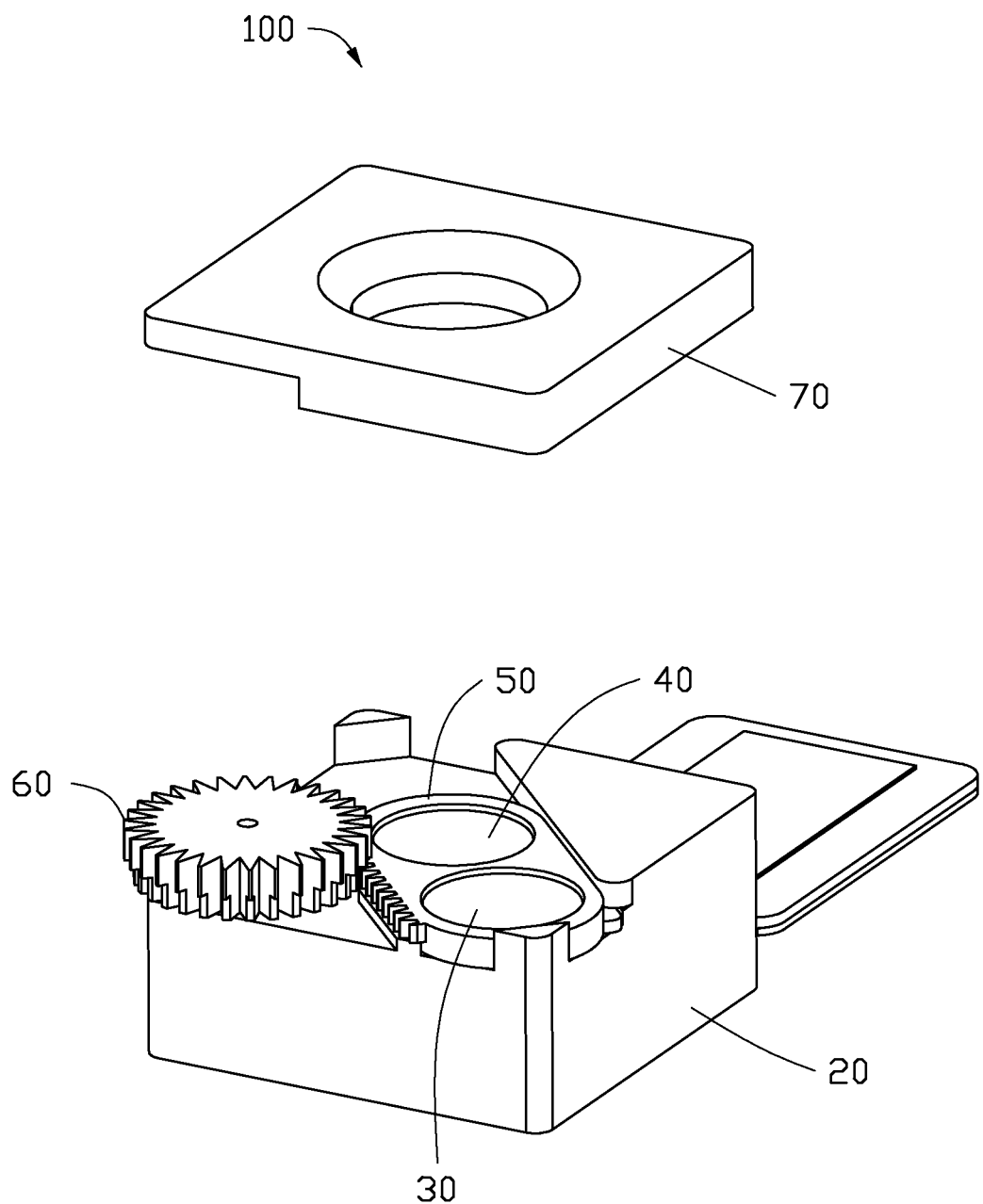
FIG. 5 is an isometric view of a camera module in FIG. 1 rotating to a second filter according to the present disclosure.

Referring to FIG. 4 and FIG. 5, when the camera module 100 operates to capture an image, the camera module can drive the gear 60 and the toothed bar 56 to engage with each other and to move the movable tray 50, such that the first filter 30 covers the first through hole 22, that is, the first filter 30 covers the lens 10 to ensure the image quality. When the camera module 100 needs iris recognition functions, the camera module 100 drives the gear 60 to move in an opposite direction so that the second filter 40 covers the first through hole 22, that is, the second filter 40 covers the lens 10 to receive the infrared light for iris recognition. Therefore, the gear 60 is driven to move the movable tray 50 and alternatively switches the first filter and the second filter to cover the lens. The two first projections 23 are used to limit the movement of the movable tray 50 to ensure that one of the first filter 30 and the second filter 40 covers the first through hole 22. The gear 60 can be driven by direct drive or manually rotated (not shown).

In other embodiments, the gear 60 can be fixedly connected with one end of the rotating shaft 61, the other end of the rotating shaft 61 is rotation connection with the first surface 21; the rotating shaft 61 is rotated to drive the movement of the gear 60.

The embodiments shown and described above are only examples. Many details are often found in the art such as the other features of a camera module. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A camera module comprises:
   a body including a first surface, wherein the first surface defines a first through hole;
   a lens provided in the body and corresponding to the first through hole, wherein a portion of the lens penetrates into the first through hole;
   a movable tray disposed on the first surface to cover the first through hole, wherein the movable tray comprises a toothed bar and two stepped holes with parallel central axes;
   a first filter disposed in one of the two stepped holes of the movable tray;
   a second filter disposed in another one of the two stepped holes of the movable tray; and
   a gear, wherein the gear is meshed with the toothed bar of the movable tray to move the movable tray and alternatively switches the first filter and the second filter to cover the lens;
   wherein the first surface further extends two first projections located symmetrically to the central axis of the first through hole, the central axis of the first through hole and one of the geometric centers of the two first projections forms a plane, the first surface further extends a carrier member located on one side of the plane, the carrier member includes a second surface perpendicular to the first surface, the second surface opens a first receiving groove along the parallel direction of the first surface, the first surface extends two guide strips located on the other side of the plane, the two guide strips are spaced and arranged along a direction parallel to the plane and each of the two guide strips includes a first contact surface which is parallel to the second surface and opposed to the second surface.

2. The camera module of claim 1, wherein the camera module further includes a rotating shaft, one end of the rotating shaft is rotation connection with the gear and another end of the rotating shaft is fixed to the first surface.

3. The camera module of claim 1, wherein the gear is rotated by direct drive or manual drives.

4. The camera module of claim 1, wherein the projection of the gear along the axial direction of the first through hole partially falls on the first surface.

5. The camera module of claim 1, wherein each of the stepped holes has a stepped diameter corresponding to the diameters of the first filter and the second filter.

6. The camera module of claim 1, wherein the movable tray further comprises a second contact surface and a strip block, the second contact surface is in contacts with the first contact surface, the strip block is positioned at an opposite side of the second contact surface and is received in the first receiving groove, the toothed bar of the movable tray is fixed to the second contact surface and is positioned on the guide strips.

7. The camera module of claim 6, wherein the camera module further comprises a protective cover disposed on the carrier member and the first projections, the protective cover comprises a third surface and a fourth surface parallel to the third surface, the third surface defines a light through hole which penetrates through the third surface and the fourth surface and has a diameter corresponding to the diameter of the first through hole, the fourth surface defines a second receiving groove communicating with the light through hole, the second receiving groove is used for receiving the gear.

8. The camera module of claim 7, wherein a distance between the central axis of the first through hole and one of the first protrusion is equal to a distance between the central axis of one stepped hole and the end of the moveable tray far away from the one stepped hole.

9. The camera module of claim 1, wherein the first projections are used for limiting the movement of the movable tray to ensure that one of the first filter and the second filter covers the first through hole.

10. A camera module comprises:
 a body including a first surface, the first surface defining a through hole having a light axis;
 a lens provided in the body and intersecting the light axis;
 a movable tray slideably mounted on the body, the tray having first and second support sections and a toothed portion;
 a first visible light filter disposed in the first support section;
 a second infrared light filter disposed in the second support section; and
 a gear engaging the toothed portion of the tray;
 wherein rotation of the gear in a first direction moves the tray to place the first visible light filter in the path of the light axis; and
 wherein rotation of the gear in a second direction moves the tray to place the second infrared light filter in the path of the light axis;
 wherein the first surface further extends two first projections located symmetrically to the light axis of the through hole, the light axis of the through hole and one of the geometric centers of the two first projections forms a plane, the first surface further extends a carrier member located on one side of the plane, the carrier member includes a second surface perpendicular to the first surface, the second surface opens a first receiving groove along the parallel direction of the first surface, the first surface extends two guide strips located on the other side of the plane, the two guide strips are spaced and arranged along a direction parallel to the plane and each of the two guide strips includes a first contact surface which is parallel to the second surface and opposed to the second surface.

* * * * *